US008521148B1

(12) United States Patent
Hohteri et al.

(10) Patent No.: US 8,521,148 B1
(45) Date of Patent: Aug. 27, 2013

(54) METHOD OF REDUCING POWER CONSUMPTION WITHIN A PORTABLE COMMUNICATION DEVICE

(75) Inventors: Harri Hohteri, Helsinki (FI); Gavin Weigh, Helsinki (FI)

(73) Assignee: RapidBlue Solutions Oy, Helsinki (FI)

( * ) Notice: Subject to any disclaimer, the term of this patent is extended or adjusted under 35 U.S.C. 154(b) by 0 days.

(21) Appl. No.: 13/372,784

(22) Filed: Feb. 14, 2012

(51) Int. Cl.
*H04M 3/00* (2006.01)

(52) U.S. Cl.
USPC .......................................................... 455/418

(58) Field of Classification Search
USPC ........ 455/404.1, 419, 550.1, 401.1; 382/109, 382/103, 154, 51
See application file for complete search history.

(56) References Cited

U.S. PATENT DOCUMENTS

2009/0082991 A1* 3/2009 Prentice et al. ............... 702/150
2010/0323657 A1* 12/2010 Barnard et al. ............ 455/404.1

* cited by examiner

*Primary Examiner* — Kiet Doan
(74) *Attorney, Agent, or Firm* — Ziegler IP Law Group, LLC.

(57) ABSTRACT

A method of reducing power consumption within a portable communication device uses spatial sensing modules to identify a stationary state or to sense motion of the device, and continuously monitors the device's surroundings. The device includes a control module coupled to the spatial sensing modules, which include a global positioning system, and a module that identifies the location of the device through a cellular wireless communication network. The method uses the control module to switch on or switch off the spatial sensing modules based on identifying that the device has been in a spatially static state for a time period or has been suddenly moved, or if any sudden changes have been detected in the device's surroundings. Furthermore, if the device is identified to be at an indoor location for a specific period of time, the control module switches off the global positioning system of the device.

17 Claims, 5 Drawing Sheets

METHOD OF REDUCING POWER CONSUMPTION WITHIN A PORTABLE COMMUNICATION DEVICE

TECHNICAL FIELD

The present disclosure generally relates to portable communication devices, and more specifically, to methods of conserving power within portable communication devices. Further, aspects of the disclosure are also directed to software products recorded on machine-readable data storage media, and such software products are executable upon computing hardware of portable communication devices, to implement the methods of the disclosure.

BACKGROUND

Portable communication devices, within the scope of the disclosure, are construed as devices which are portable, and which are capable of supporting wireless communication. Typical examples of portable communication devices include, although are not limited to, mobile telephones, cellular phones, wireless-enabled tablet computers, iPhones™, iPods™ personal laptop computers, personal digital assistants ("PDA's") and other such similar devices [Superscript™ stands for registered trademarks].

Currently, portable communication devices, including cellular phones, are equipped with advanced functionalities, for example, their enhanced processing capabilities, wider screen area, multiple interfacing sensors, and other similar advanced features incorporated into such devices. Often, such devices, including cellular phone, are provided with modules for determining an exact position and location of the devices. For example, many mobile devices have global positioning systems (GPS) to determine their exact location. GPS systems have a GPS receiver, which is synchronized with geostationary satellites, and the GPS receiver continuously receives signals from the satellites, to determine the exact location of the devices, and more specifically, their exact latitudinal and longitudinal positions. Certain cell based location determination systems are available in the art, which use the cellular ids of the portable devices, to identify their location. Further, there are systems which determine position of portable communication devices, using triangulation technique, trilateration and by using some signal strength methods too. Techniques are also available to determine positions of portable communication devices by analyzing signals received by the devices from certain near-field wireless sources.

A major problem associated with the aforementioned position/location determination systems, incorporated in portable communication devices, is that such systems generally consume a lot of power during determining location of the devices, and hence, they drain a lot of energy from the battery of the devices. Attempts have been made in the art to overcome this problem. For example, many smart phones, including the 'Juice Defender' for Android™ platforms, are equipped with functionality to selectively switch off or switch on, certain modules in the phones. For example, when the smartphone is not in a dedicated cellular cell of a wireless communication infrastructure, i.e., it is unable to find a typically used base station, the Wireless local area network (WLAN) of the phone can be set to switch-off in such circumstances. The reason is that the probability of finding a Wi Fi network is generally low, when the device is not in a typically used based station.

However, the problem of high consumption of the energy stored within portable communication devices, while determining their locations, still persists, and the current attempts to reduce power consumption within such devices have not been substantially effective. Therefore, there exists a need to have a better method for reducing the consumption of power within such devices.

SUMMARY

The present disclosure provides a method and a system for substantially reducing the consumption of power within portable communication devices, while identifying the location of such devices through different location identifying modules installed within the devices.

In one aspect, the present disclosure provides a method for reducing the consumption of power within a portable communication device. The device includes multiple spatial sensing modules for determining the location of the device. The method includes, using at least one or more of the spatial sensing modules, to identify whether device is in a spatially stationary state for a certain period, to sense any motion of the device, and to continuously monitor the surroundings of the device for identifying any sudden change in the surroundings. One or more or the spatial sensing modules of the device, are selectively switched on or switched off, to reduce the consumption of power, based on identifying that the device has been at a spatially constant location for some period, or based on identifying any sudden motion of the device, or based on any sudden changes monitored in the surroundings of the device.

In another aspect, the present disclosure provides a portable communication device equipped with a battery, and the device is adapted to save the energy stored within its battery. The device includes multiple spatial sensing modules to sense motion, to sense a spatially stationary state of the device for a certain period, and to continuously monitor the device's surroundings. Further, the device is provided with a control module operatively coupled to the spatial sensing modules. The control module selectively switches on or switches off, one or more of the spatial sensing modules to reduce power consumption, when the device is identified to be spatially static for a certain period, or is suddenly identified to move, or when a sudden change in the surroundings of the device is observed. The spatial sensing modules include a global positioning system and a module, which when operable, determines the position of the device using a cellular wireless communication infrastructure through which the device communicates, and through a suitable near-field communication infrastructure proximal to the device. The global positioning system determines the position of the device through communication between a GPS receiver, which the device is equipped with, and a set of GPS satellites. Further, the spatial sensing modules include multiple inertial motion sensors to continuously detect any sudden change in orientation of the device, or a sudden movement of the device, or to sense that the device is in a spatially constant location for some period. In an aspect, if the device is identified to be at an indoor location for a specific period, the control module turns off the GPS system of the device, to save power consumption. Further, if the device is identified to move from the indoor location, to an outdoor location, the control module switches on the GPS system back again.

The method of the present disclosure substantially alleviates the aforementioned problems of higher power consumption within portable consumption devices, while determining the location of such devices.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the invention is not limited to specific methods and instrumentalities disclosed herein. Moreover, those in the art will understand that the drawings are not to scale. Wherever possible, like elements have been indicated by identical numbers.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

Portable communication devices, including mobile devices, cellular phones, iPads, iPhones, personal laptop computers, personal digital assistants (PDA), are predominantly used in the art, for communication and other purposes, and such devices are often equipped with the feature of supporting wireless communication, including the Wireless Local Area Networks (WLAN), through suitable applications/modules installed within the devices. Further, most of these devices are provided with many accurate position determination systems, for precisely identifying the exact location of the devices. An example of such position determination system is the Global positioning system (GPS), which is currently available in most advanced cellular phones, including smart phones and iPhones, for navigation and position determination. GPS is a satellite based navigation system, which is capable of providing spatial position and the time information under all weather conditions, anywhere on the Earth. Specifically, the devices are equipped with a GPS receiver, and the receiver is in continuous communication with the GPS satellites revolving around the earth. With an unobstructed line of sight with at least three of the GPS satellites, the system is capable of precisely determining the location of the device, in terms of its longitude, latitude, altitude above the sea level etc. Specifically, the GPS receiver continuously receives signals from at least three GPS satellites, and calculates the times taken to receive the messages from the at least three satellites, and uses these times to determine the distance of the receiver to the at least three satellites. Further, different algorithms and trilateration techniques are then used, to determine the position of the device. Additionally, some portable communication devices are provided with other spatial location modules for determining their location on the Earth's surface. One such spatial location module uses cell-based location technique, identifies the cellular cell ID of the device, and uses triangulation technique to identify location. Further, there are other indoor location systems that these devices are equipped with, Bluetooth or the Wi Fi networks etc.

A major problem associated with many of these spatial location determination systems, including GPS, is that they consume considerable power of the battery of the devices, during determining their locations. Eventually, the batteries become drained in a few hours. Users of such devices, including cellular phone users, are often at a spatially constant location for many hours. For example, a working professional normally spends about 7-8 hours at his office, thus being at a spatially constant location during that time. During such moment, it is generally not desired to use longer spatial range detection modules, for determining the location of the device, as these modules, including the GPS system, will consume a lot of stored battery energy. Therefore, keeping such modules activated/energized during such circumstances, is unnecessary from the perspective of saving the energy stored within the device's battery.

The present disclosure provides a more effective and efficient way of reducing the power consumption within a portable communication device, by identifying that the device is in a spatially stationary state for some period, i.e. at a spatially constant location for some period, or is suddenly moved from that location. Specifically, the portable communication device is provided with multiple spatial sensing modules for sensing motion or a spatially stationary state of the device. Some of these spatial sensing modules continuously monitor the surroundings of the device. One or more of these spatial sensing modules is switched on or switched off, in a hierarchical manner, based on certain conditions, as disclosed in details hereinafter.

Figure 1:
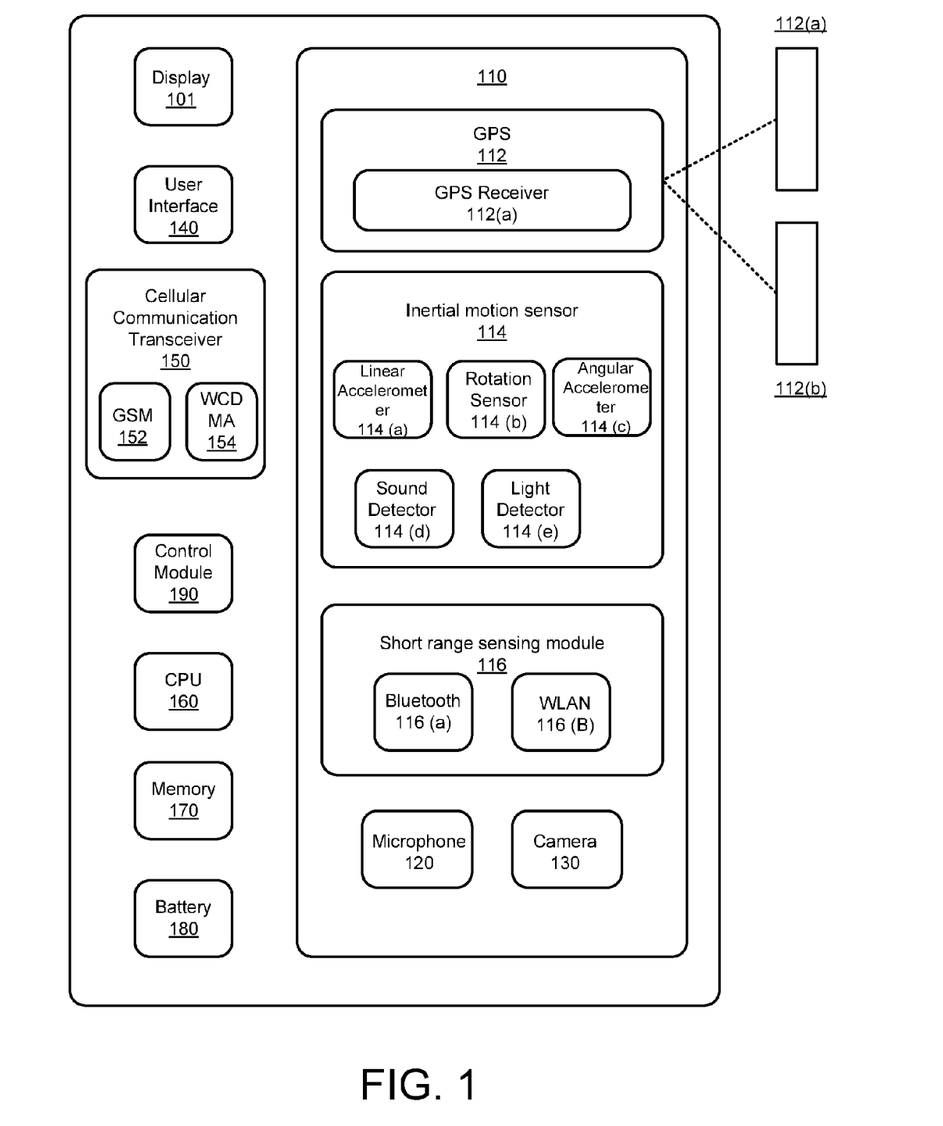
FIG. 1 illustrates different spatial sensing modules of a portable communication device, in accordance with the present disclosure.

The FIG. 1 is an illustration of different components of a portable communication device 100 (referred to as 'device 100' hereinafter, for simplicity and economy of expression), in accordance with the present disclosure, the device 100 being adapted to save energy stored within its battery. As aforementioned, the device 100 can be any appropriate device known in the art, and capable of supporting wireless communication. This may include, though not be limited to, a mobile phone, a smart phone such as an iPhone, Android phone, iPad from Apple, Inc., a laptop, a Symbian phone etc. Furthermore, the device 100 is optionally equipped with 2G or 3G technology, or WCDMA, TDMA, GSM, LTE etc., for supporting wireless communication. As shown in FIG. 1, the device 100 has a display 101, configured to render text, videos or images/pictures, to the user. Furthermore, the device 100 includes multiple spatial sensing modules 110, for detecting the position of the device, and accurately determining its spatial location. The spatial sensing modules 110 include a GPS 112, for determining the exact location of the device on the Earth's surface, in terms of its latitude, longitude and its altitude above the sea level. As shown, the GPS 112 includes a GPS receiver 112 (*a*), which is coupled to at least three GPS satellites 112 (*b*), and it continuously obtains signals from the GPS satellites 112 (*b*), to determine the location of the device 100. Furthermore, the spatial sensing modules 110 include an inertial motion sensor 114 for determining the orientation, for sensing movement, and for sensing the acceleration of the device 100. Specifically, the inertial motion sensor 114 (hereinafter 'sensor 114') includes a linear accelerometer 114 (*a*) for determining linear acceleration of the device 100. Furthermore, the sensor 114 includes a rotation sensor 114 (*b*), for determining the orientation of the device 100, and for sensing any sudden change in the orientation. For example, if the device 100 has been kept stationary on a table, for a substantially long period, and suddenly the user picks it up in his hands, or slightly rotates it from its current position, the rotation sensor 114 (*b*) is able to detect the change in the orientation of the device 100. An angular accelerometer 114 (*c*) measures angular acceleration of the device 100 if it is suddenly rotated. Furthermore, the sensor 114 includes a sound detector 114 (*d*) for detecting any sudden sounds produced proximal to the device 100, or the sound generated when the device 100 is suddenly moved or put over a supporting surface. For example, if the user suddenly puts the device 100 on a table, the sound detector 114 (*d*) is capable of identifying the corresponding sound. A light detector 114 (*e*) monitors the ambience of the device 100 and identifies changes in illumination of the device 100's surroundings. For example, if the device 100 is suddenly moved from an outdoor location on a sunny afternoon, to a dark room, the light detector 114 (*e*) identifies such a change.

The spatial sensing modules 110 also include a short range sensing module 116 for short range communication and indoor/proximity location. The short range sensing module 116 includes a Bluetooth module 116 (*a*), and Wireless Local Area Network (WLAN) module 116 (*b*) for communication. Other typical applications known in the art, for short range communication and data exchange with other devices, can also be incorporated within the short range sensing module 116, thus not limiting the scope of the disclosure.

A microphone 120 is provided for receiving sounds on the device 100. A camera 130 is configured to capture images and videos, when turned on. A user interface 140 obtains appropriate inputs from the user, for enabling operations on the device 100. The user interface 140 can be any suitable means known in the art, and is normally provided in portable communication devices, for obtaining user inputs, including a touch screen with suitable keys incorporated, or a keypad. Furthermore, the device 100 includes a cellular communication transceiver 150, such as GSM 152 or WCDMA 154 for enabling communication according to cellular communication standards, for example 3GPP. A central processing unit 160 executes software applications typically stored in the memory 170 of the device 100.

A battery 180 stores energy within it, to provide power for the operations of the device 100. The battery 180 can be any suitable means known in the art, and usable in communication devices. For example, the battery 180 can be a Lithium ion battery cell (LiOn), a rechargeable Zinc-air battery, a rechargeable Aluminium-Carbon battery or a battery driven by power related electronics. Furthermore, other chargeable battery, like the Nickel-Metal hydride (NiMH), or a Nickel-Cadmium battery, can also be used. Furthermore, the battery 180 has a connection point to an external charger. The device 100 is provided with a housing and suitable audio output, and input/output interfaces, and Universal Serial Bus (USB) ports.

A control module 190 is coupled to the different spatial sensing modules 110, and it is configured to selectively switch on or switch off one or more of the spatial sensing modules 110, based on a set of conditions that will described hereinafter, in details. A control module 190 can consist of electrical components configured to provide control signals to other modules. A control module 190 is preferably implemented as an application stored in memory 170 and executed in CPU 160. In an embodiment controlling of other modules is done/managed by the CPU 160. In some embodiments one or more modules can be physically implemented in a singe integrated circuit (IC) and/or be integrated to CPU architecture.

Figure 2:
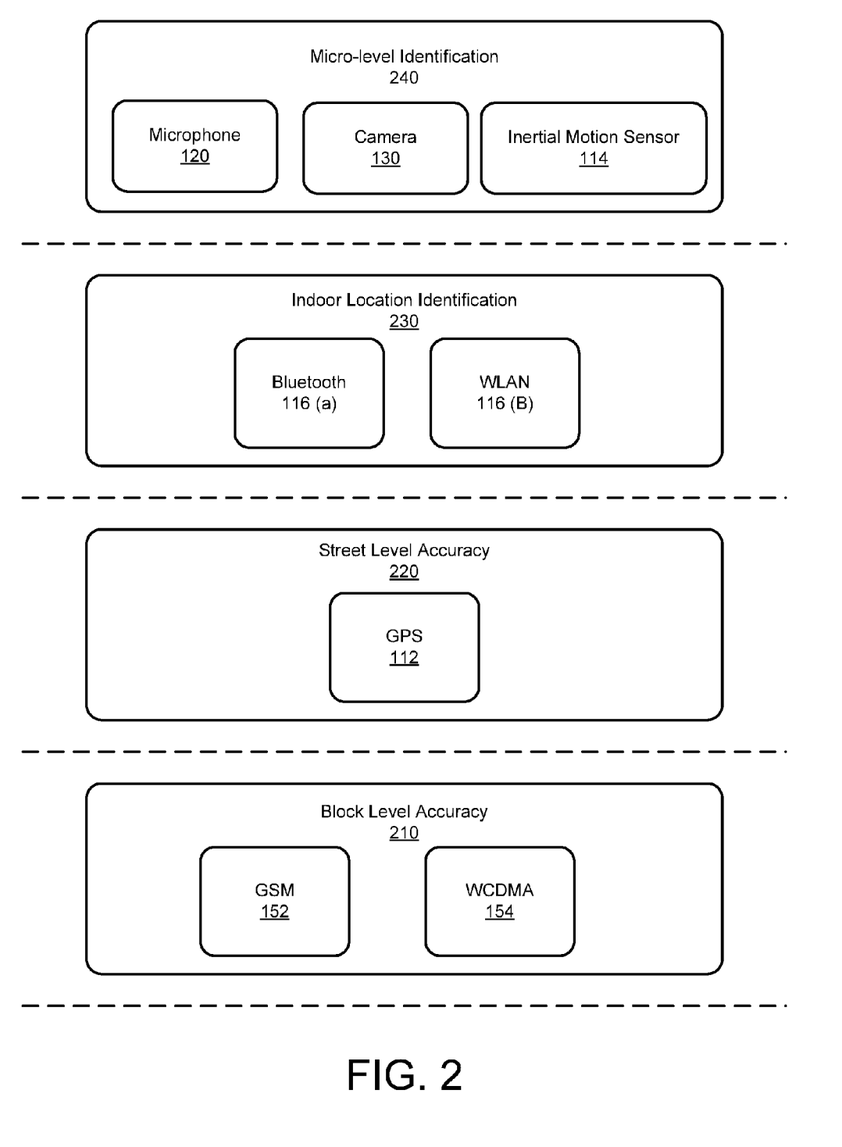
FIG. 2 depicts the different spatial sensing modules, rearranged at different hierarchical levels, the hierarchical levels corresponding to the different levels of accuracy desired while determining the location of the device, in accordance with the present disclosure.

The mutually different spatial sensing modules 110 can be used to determine the location of the device 100, based on the different levels of accuracy desired. FIG. 2 shows a rearrangement of the different spatial modules at different hierarchical levels, and illustrates their usage, based on different levels of accuracy desired, while determining the location of the device 100. At each level, the different spatial sensing modules disposed, are utilized for obtaining accuracy pertaining to that level.

Explaining FIG. 2 in conjunction with FIG. 1, the level 210 corresponds to a block level accuracy, when accuracy to within 1 km to 10 km of radius range from the device 100 is desired. This level of accuracy is achieved by analyzing signals between the cellular transceiver 150 and the cellular base station with which the cellular transceiver 150 communicates. For example, the cellular ID of the device 100 can be mapped to a geographical location, either locally, or the location can be converted into a real location by sending the cellular ID to a server providing geo-location services. Although only GSM 152 and the WCDMA 154 are shown in FIG. 2, the method can optionally also use any other appropriate technology in conjunction with GSM/WCDMA (e.g., LTE, CDMA 2000, TD-SCDMA etc).

The level 220 corresponds to a case when a street level accuracy is desired. Typically, this is an accuracy within a range of 10 meters to 50 meters. For street level accuracy, the appropriate spatial sensing module 110 is the GPS 112 (shown in FIG. 1). The GPS module 112 can accurately determine the spatial location of the device 100 within this range.

The level 230 corresponds to the indoor location identification. This pertains to the case when the device 100 is identified to be at an indoor location, for example, within a house or within an office premises. For indoor location identification, the short range spatial sensing modules 116 as shown in FIG. 1 can be used, including, for example, the Bluetooth 116 (*a*) or the WLAN 116 (*b*), for communication and data exchange. Usage of these short range sensing modules 116, at the level 230, typically requires communication and connection of the device 100 with suitable Bluetooth and WLAN stations. These will be shown in further detail in FIG. 3. Furthermore, the device 100 is equipped with appropriate dedicated software applications for using the short range sensing modules 116 at the level 230. The WLAN 116 (*b*) can also be used at times, in outdoor locations, thus not limiting the scope of the disclosure.

The level 240 corresponds to the micro-level identification. At this level, the inertial motion sensors 114, the camera 130, the microphone 120, etc., can be used. Specifically, the micro-level identification at the level 240, refers to sensing certain situations, for example, whether the device 100 is moving, or is at a spatially constant location for a certain temporal period, is lying on a table for a substantially long time, or for sensing a sudden movement of the device 100 from a location, where it has been detected to be lying for some temporal period. For this purpose, the camera 130 is adapted to continuously capture the images of the surroundings of the device 100, and store them in a database. Based on the captured images, the camera 130 can identify whether or not the device 100 has been moved from one location to the other, based on any changes in the captured images of the device's surroundings. For example, if the device 100, lying initially on a desk or a table, is moved to some other location, there may be a sudden change in the appearance of roof and the ceilings, and this may be easily identified by the camera 130, for example as a change in color or intensity of light, or both. The sound detector 114 (d) continuously detects any sounds generated proximal to the device 100. For example, if the user suddenly places the device 100 on a table, the sound detector 114 (d) detects the corresponding sound and provides signals to the control module 190 (shown in FIG. 1). If the device 100 is suddenly moved from a relatively darker location, for instance, within a room, to an illuminated outdoor area, the light detector 114 (e) can detect the sudden change in the surroundings and provide corresponding signals to the control module 190. Furthermore, the linear and angular accelerometers 114 (a) and 114 (c), respectively, and the rotation sensor 114 (b), can collaborate, or work independently to detect any change in the orientation of the device 100, or to sense any sudden motion of the device 100, and provide the corresponding signals control module 180.

Figure 3:
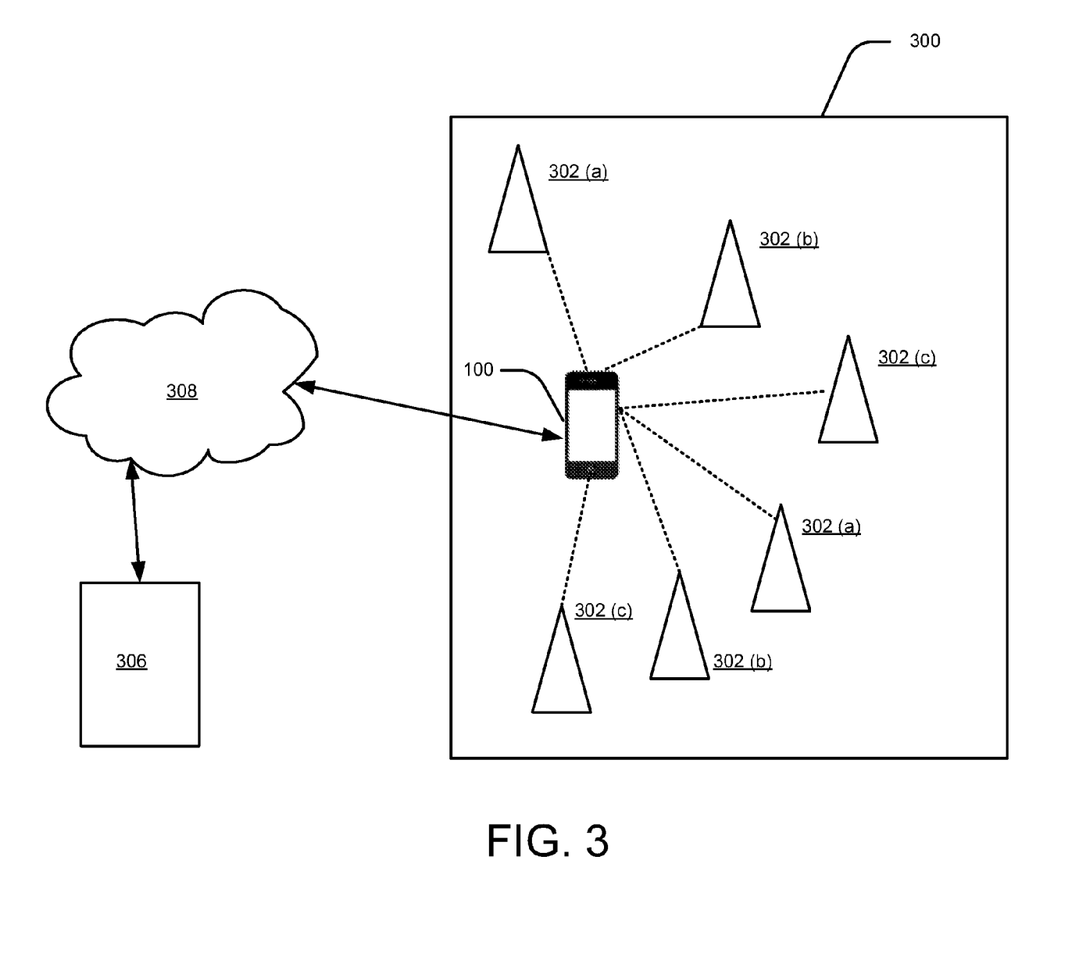
FIG. 3 illustrates the communication between the device of FIG. 1, with different Bluetooth and WLAN stations coupled to the spatial sensing modules of the device, for determining the location of the device, when it is at an indoor location.

FIG. 3 illustrates the case when the device 100 is identified to be at an indoor location, and the method of identifying the location of the device 100 using one or more of the short range spatial sensing modules 116, for example, the Bluetooth 116 (a) or the WLAN 116 (b) of FIG. 1. As shown, the device 100 is depicted lying within the confinements of an indoor environment 300. To enable the short range spatial sensing modules 116, the device 100 is operatively connected to, and communicates with one or more Bluetooth stations 302 (a), 302 (b), 302 (c) etc., and simultaneously with multiple WLAN stations 304 (a), 304 (b) and 304 (c), as shown. Furthermore, the device 100 is connected to a server 306 through the Internet 308. For analyzing the indoor environment 300, radio signals emitted by the device 100 are used to identify the indoor location. The device 100 is equipped with suitable applications installed within it, and it requires connection with at least three base stations, to analyze and identify the indoor confinement 300. A suitable technique known in the art, for example, triangulation, is used to determine the indoor location of the device 100. The location is then transmitted to the server 306 via the Internet 308. Specifically, triangulation technique includes calculating the time of flight (TOF) of the radio signals, measuring the strength of the signals and calculating the parameter 'received signal strength indicator' (RSSI), etc. for the signals transmitted to the Bluetooth or WLAN stations.

Figure 4:
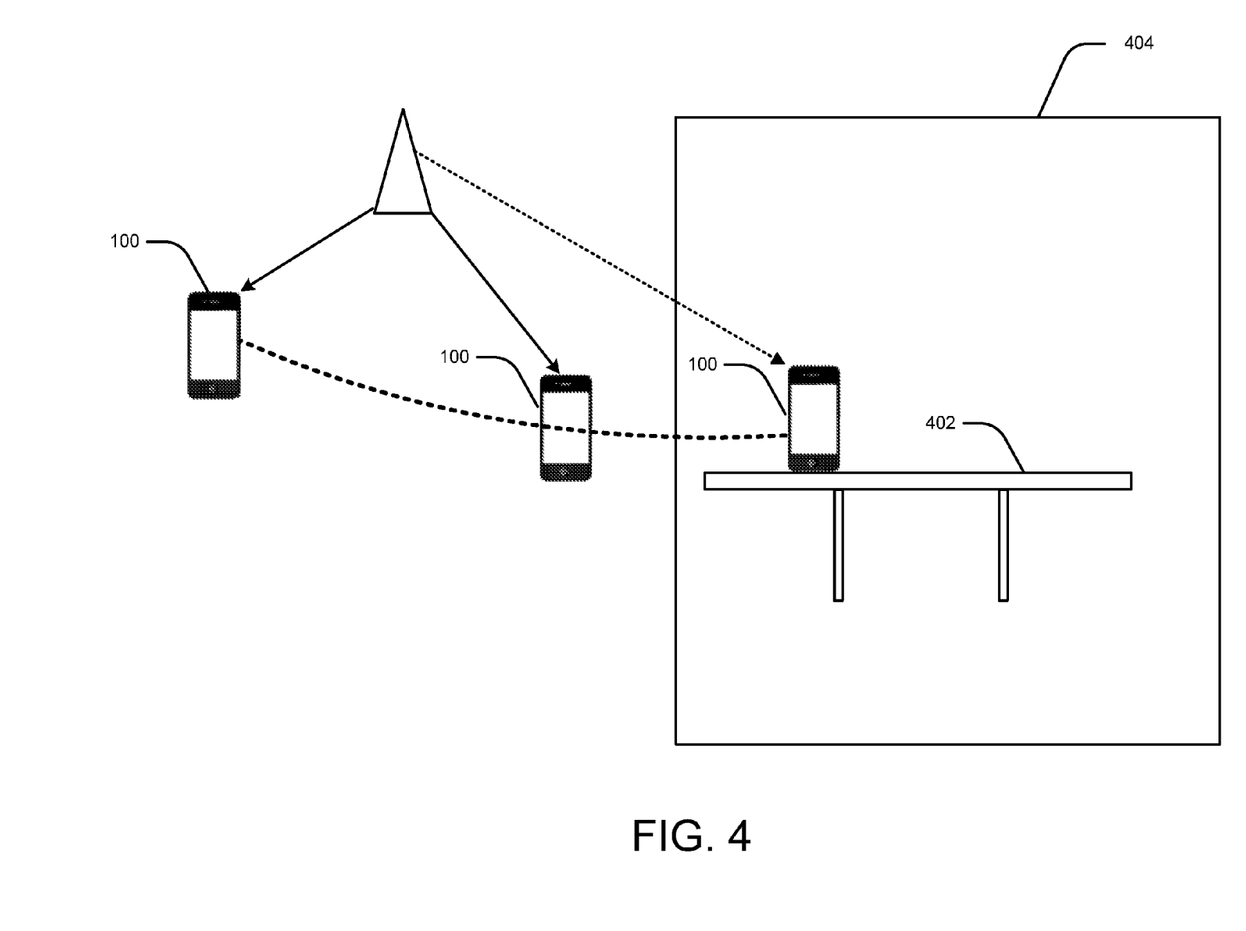
FIG. 4 illustrates an embodiment, wherein the device of FIG. 1, in accordance with the present disclosure, is identified to be lying at a spatially constant location, within an indoor confinement.

In FIG. 4, an embodiment of the disclosure is shown, wherein the device 100 is lying over a desk 402, within an indoor location. In such a situation, the micro-level identification modules, shown in FIG. 2, are used to sense sudden motion and to monitor the surrounding of the device 100 continuously. Explaining FIG. 4 in conjunction with FIG. 1, selected spatial sensing modules 110, including the camera 130, the microphone 120 and the inertial motion sensors 114 are used continuously to detect any changes in the surroundings of the device 100, and to sense any sudden motion of the device 100. Eventually, the corresponding signals are conveyed to the control module 190. As identified by the inertial motion sensors 114, if the device 100 is identified to be lying stationary over the desk 402, for a substantially long period, for example several minutes, or even several hours, the corresponding signals are conveyed to the control module 190. The control module 190 switches off one or more of the short range spatial sensing modules, including the Bluetooth 116 (a) or the WLAN 116 (b), to save power. Furthermore, the control module 190 also switches off the device's GPS receiver 112 (a), in such a situation. Preferably, the control module 190 generally always switches off the device's GPS 112, if the device 100 is identified to be at an indoor location, or at a spatially constant location, for some period, for example several minutes, or several hours. This saves a lot of energy stored within the device's battery, and since signals from the GPS satellites are typically harder to receive indoors, it is unnecessary to keep the GPS 112 switched on. Furthermore, if the user picks up the device 100 from the desk 402, a micro-level change in the location of the device 100, is detected by one or more of the inertial motion sensors 114, the microphone 120 and the camera 130. If it is detected that the device 100 is moved from the indoor location to an outdoor location, the corresponding signals are conveyed to the control module 190. The control module 190 switches back on, the GPS 112 and the GPS receiver 112 (a) of the device 100, if this movement is sensed. Furthermore, the Bluetooth 116 (a) and the WLAN 116 (b) are switched on again, when the device 100 is identified to move to an outdoor area.

Figure 5:
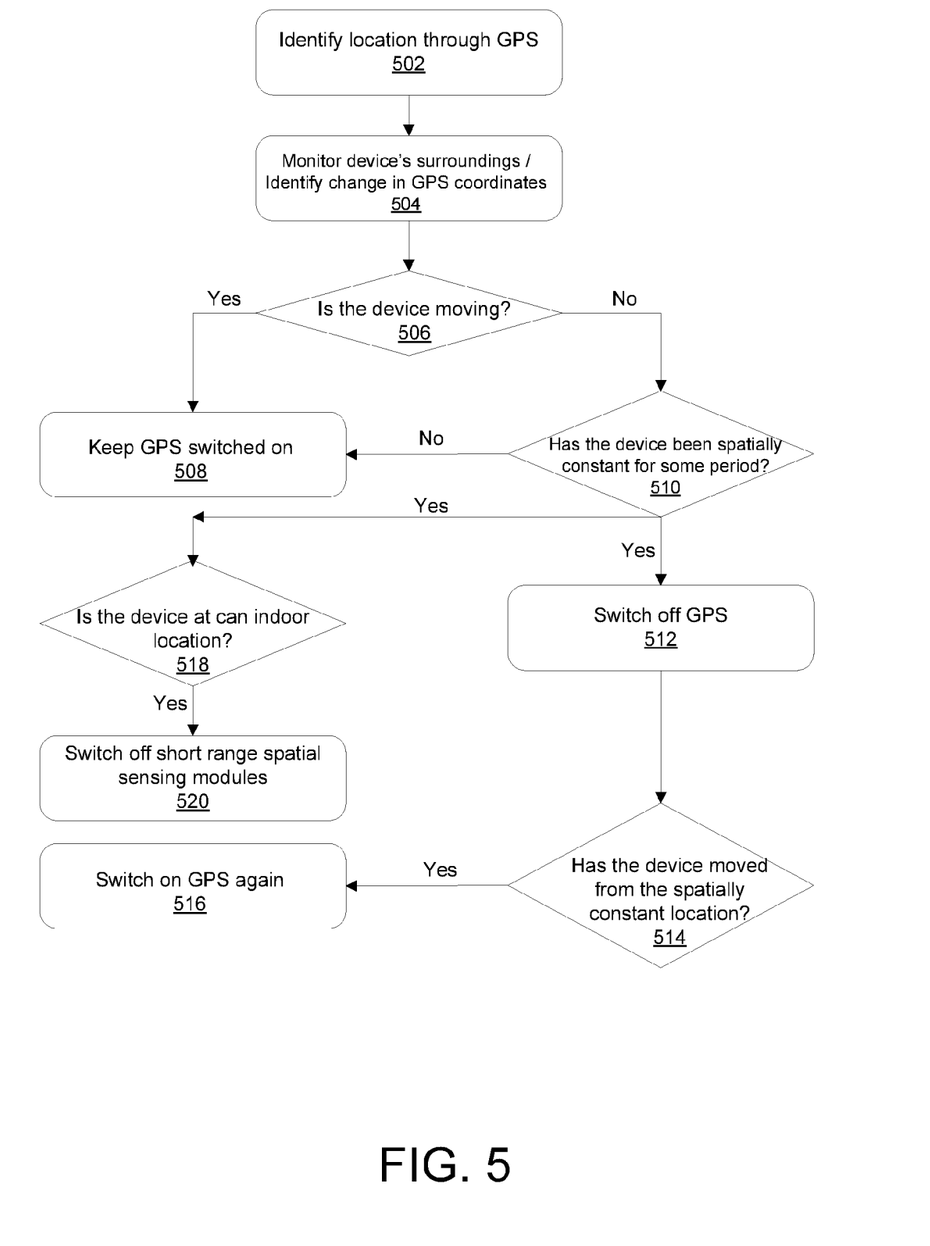
FIG. 5 illustrates the different steps involved in the method of reducing the power consumption within the portable communication device of FIG. 1, in accordance with the present disclosure.

The FIG. 5 illustrates the different steps involved, in the exemplary method 500, for reducing power consumption within the device 100, in accordance with the present disclosure. Explaining the method 500, in conjunction with FIG. 1, at a step 502, the method 500 continuously identifies the location of the device 100 through the GPS 112. At this step 502, the GPS receiver 112 (a) (shown in FIG. 1), continuously communicates with, and receives signals from, at least three GPS satellites in the unobstructed line of sight, and determines therefrom an exact location of the device 100, in terms of its longitude, latitude and altitude, as aforementioned. At a step 504, the method 500 continuously monitors surroundings of the device 100, and identifies any changes in the GPS coordinates of the device 100. The method 500 also senses an existence of a stationary state or a sudden movement of the device 100, at this step 504. Effectively, any sudden change in the position of the device 100 can be observed by change in its GPS coordinates, as there is always a slight drift in the position of the device 100, as shown by the GPS 112, when the device 100 moves. Furthermore, the inertial motion sensors 114, including the linear accelerometers and the angular accelerometers 114 (a) and 114 (c), respectively, are used at the step 504, to sense that the device 100 is stationary (i.e., at a spatially constant location), or for sensing the motion of the device 100, or a sudden change in its position. At a step 506, the method 500 identifies whether or not the device 100 is moving. If the device 100 is moving, the GPS 112 of the device 100 is kept switched on at a step 508. If the device 100 is not moving, then at a step 510, the method 500 identifies whether or not the device 100 has been at a spatially constant location for some temporal period. If the device 100 is not moving, i.e., at the spatially constant location for the temporal period, then at a step 512, the GPS 112 is switched off to save power consumption within the device 100. Proceeding further, at a step 514, the method 500 continuously monitors the state of rest of the device 100, and identifies whether or not the device 100 has started moving again, from the spatially constant location identified at step 510. If yes, i.e., the device 100 has started moving again, then at a step 516, the previously turned off GPS 112 is switched back on again. Furthermore, at a step 510, if the method identifies that the device 100 is at a spatially constant location for some period, the method 500 further checks at a step 518, whether or not the device 100 is at an indoor location. For this purpose, the inertial motion sensors 114 are used, to continuously monitor the surroundings of the device 100, and to sense motion of the device 100. The different inertial motion sensors 114, continuously interact with the control module 190 at this step 518. If the device 100 is identified to be at an indoor location, then at a step 520, the shorter range spatial sensing modules, including the Bluetooth 116 (a) and the WLAN 116 (a), are switched off to save power. Furthermore, the GPS 112 of the device 100 is still kept switched off to save power consumption within the device 100. In an embodiment, though not shown, the method 500, proceeding further from the step 520, continuously monitors the surroundings of the device 100, and checks whether or not the device 100 is still continuing to be at the indoor location identified at the step 518. This is again achieved by using the inertial motion sensors 114, including the linear accelerometers 114 (a), the angular accelerometers 114 (c), and the rotation sensors 114 (b), which are capable of sensing sudden motion of the device 100. If yes, then the shorter range spatial sensing modules and the GPS 112, are kept switched off. Otherwise, if any motion of the device 100 is detected, and it is identified to move from the indoor location identified at the step 518, to an outdoor area, the previously turned off GPS 112 and the shorter range spatial sensing modules, are switched on again.

The method in accordance with the present disclosure, as illustrated in FIG. 5, is implementable on, and is compatible with, any portable communication device that supports wireless communication, and is in operable connection with near-field wireless communication networks, or Bluetooth stations, WLAN stations etc. Furthermore, the disclosure is not limited merely to mobile devices, but works equally with other portable communication devices, examples of which were set forth before, including iPads, personal laptop computers etc.

Although the current invention has been described comprehensively, in considerable detail to cover the possible aspects and embodiments, those skilled in the art would recognize that other versions of the invention are also possible.

What is claimed is:

1. A method of reducing power consumption within a portable communication device, the device including a plurality of spatial sensing modules, the method comprising:
   using one or more of the spatial sensing modules to sense motion or a spatially stationary state of the portable communication device, and to continuously monitor the device's surroundings; and
   using a control module of the device, for selectively switching ON or switching OFF one or more of the plurality of spatial sensing modules in a hierarchical manner, to reduce power consumption, in response to sensing motion or the spatially stationary state of the device, and/or in response to monitoring the device's surroundings, and further comprising:
   employing, for the spatial sensing modules, one or more of: global positioning system, and a module operable to determine the position of the device using a cellular wireless communication infrastructure through which the device is operable to communicate and through near-field wireless communication infrastructure proximal to the device, and at least one inertial motion sensor incorporated within the portable communication device.

2. The method of claim 1, wherein the inertial motion sensor includes at least one of: a linear accelerometer, a rotation sensor, an angular accelerometer, a sound detector, and a light detector.

3. The method of claim 1, wherein determining the position with respect to the cellular wireless communication infrastructure, through which the portable communication terminal is operable to communicate, is implemented by using a triangulation technique.

4. The method of claim 1, wherein the method further comprises using one or more longer spatial range modules as spatial sensing modules, and using the control module to switch OFF the one or more of the longer spatial range modules, for a specific period of time, when the device is identified to be at a spatially constant location.

5. The method of claim 4, wherein the longer spatial range modules include at least one of: a global positioning system, and a module for determining position of the device with respect to a cellular wireless communication infrastructure through which the device is operable to communicate.

6. The method of claim 1, wherein the method further comprises using one or more longer spatial range modules as the spatial sensing modules, and using the control module to switch ON one or more of the longer spatial range modules, when the device is identified to move from a spatial location where it has been in a spatially static state for a period of time.

7. A non-transient computer programmable product recorded on a machine-readable data storage media and being executable on computing hardware, for implementing the method of claim 1.

8. The non-transient computer programmable product of claim 7, the product being downloadable as a software application onto a portable communication device.

9. A portable communication device provided with a battery and operable to save energy stored within its battery, the device comprising:
   a plurality of spatial sensing modules for sensing motion or a spatially stationary state of the device, and to continuously monitor the device's surrounding; and
   a control module operatively connected to the plurality of spatial sensing modules, the control module being configured to selectively switch ON or switch OFF one or more of the spatial sensing modules in a hierarchical manner, to reduce power consumption, in response to sensing motion or a spatially stationary state of the device, and/or in response to monitoring the device's surroundings,
   wherein the spatial sensing modules include:
   a global positioning system;
   a module operable to determine the position of the device using a cellular wireless communication infrastructure through which the device is operable to communicate, and
   through near-field wireless communication infrastructure proximal to the device; and at least one inertial motion sensor incorporated within the portable communication device for sensing movement of the device.

10. The device of claim 9, wherein the inertial motion sensor includes at least one of: a linear accelerometer, a rotation sensor, an angular accelerometer, a sound detector, and a light detector.

11. The device of claim 9, wherein the module is configured to determine the position of the device using a cellular wireless communication infrastructure through which the device is configured to communicate using a triangulation technique.

12. The device of claim 9, wherein the spatial sensing modules include one or more longer spatial range modules, and the control module is configured to switch OFF one or more of the longer spatial range modules, for a specific period of time, when the device is identified to be at a spatially constant location.

13. The device of claim 12, wherein the longer spatial range modules include at least one of: a global positioning system, and a module operable to determine the position of the device with respect to a cellular wireless communication infrastructure through which the device is operable to communicate.

14. The device of claim 9, wherein the spatial sensing modules include one or more longer spatial range modules, and the control module is configured to switch ON one or more of the longer spatial range modules, when the device is identified to move from a spatial location where it has been in spatially static state for a period of time.

15. The device of claim 9, wherein the spatial sensing modules include a global positioning system, and the control module is configured to switch OFF the global positioning system, if the device is identified to be in a spatially static state for a specific period of time.

16. The device of claim 9, wherein the spatial sensing modules include a global positioning system, and the control module is configured to switch OFF the global positioning system, if the device is identified to be at an indoor location for a specific period of time.

17. The device of claim 16, wherein the control module is configured to switch ON the global positioning system, if the device is identified to move from the indoor location to an outdoor location.

* * * * *